US010870603B2

(12) United States Patent
Talukdar et al.

(10) Patent No.: US 10,870,603 B2
(45) Date of Patent: Dec. 22, 2020

(54) HEMP STRAW ASH AS A SUPPLEMENTARY CEMENTITIOUS MATERIAL

(71) Applicant: Nextleaf Solutions Ltd., Coquitlam (CA)

(72) Inventors: Sudip Talukdar, Burnaby (CA); Spencer Behn, New Westminster (CA); Kumayl Aarifali Rashid, Delta (CA); Farhad Pargar, Vancouver (CA); Cristina Zanotti, Vancouver (CA)

(73) Assignee: Nextleaf Solutions Ltd., Vancouver (CA)

( * ) Notice: Subject to any disclaimer, the term of this patent is extended or adjusted under 35 U.S.C. 154(b) by 23 days.

(21) Appl. No.: 16/537,850

(22) Filed: Aug. 12, 2019

(65) Prior Publication Data

US 2020/0354272 A1 Nov. 12, 2020

Related U.S. Application Data

(60) Provisional application No. 62/845,654, filed on May 9, 2019.

(51) Int. Cl.
*C04B 18/10* (2006.01)
*C04B 28/04* (2006.01)
*C04B 111/00* (2006.01)

(52) U.S. Cl.
CPC ............ *C04B 18/101* (2013.01); *C04B 28/04* (2013.01); *C04B 2111/00017* (2013.01)

(58) Field of Classification Search
CPC ................. C04B 18/101; C04B 28/04; C04B 2111/00017
See application file for complete search history.

(56) References Cited

U.S. PATENT DOCUMENTS

2019/0256421 A1* 8/2019 Daubresse .............. C04B 28/10

FOREIGN PATENT DOCUMENTS

| CN | 106082935 A | * 11/2016 | |
|---|---|---|---|
| FR | 3055132 A1 | * 2/2018 | ............. G04B 28/10 |
| KR | 102043391 B1 | * 11/2019 | |

OTHER PUBLICATIONS

Asha, P., Salman, A., & Kumar, R. A. (2014). Experimental Study on Concrete with Bamboo Leaf Ash. International Journal of Engineering and Advanced Technology (IJEAT), 46-51.
Booth, M. S. (2018). Not carbon neutral: Assessing the net emissions impact. Environ. Res. Lett., 1-11.
Boral Property & Investor Trading. (May 2018). Boral Property & Investor Trading. Retrieved from Fly Ash Slides for Investors: https://www.boral.com/sites/corporate/files/media/field_document/180528-Flyash-slidesfor-investors-as-at-29May2018.pdf.
Canada. (Mar. 22, 2019). Statistics, Reports and Fact Sheets on Hemp. Retrieved from Canada.ca: https://www.canada.ca/en/health-canada/services/drugs-medication/cannabis/producing-sellinghemp/about-hemp-canada-hemp-industry/statistics-reports-fact-sheets-hemp.html.
Crow, J. M. (2008). The concrete conundrum. Chemistry World, 62-66.
Das, L., Enshi, L., Saeed, A., Williams, D., Hu, H., Li, C., . . . Shi, J. (2017). Industrial hemp as a potential bioenergy crop in comparison with kenaf, switchgrass and biomass sorghum. Bioresource Technology, 641-649.
Fraser, T., Bhabra, A., & Rteil, A. (2017). Using Waste Wood Ash As Cement Replacement: Optimum. CSCE Leadership in Sustainable Infrastructure (pp. 1-9). Vancouver, BC: Canadian Society for Civil Engineering.
Grand View Research. (2018). Legal Marijuana Market Size, Share & Trends Analysis Report By Type (Medical, Recreational), Byproduct Type, By Medical Application (Chronic Pain, Mental Disorders, Cancer), And Segment Forecasts, 2018-2025. San Francisco: Grand View Research.
Health Canada. (Aug. 11, 2016). Considerations When Producing Cannabis. Retrieved from Government of Canada: https://www.canada.ca/en/health-canada/services/information-bulletin-safety-securityconsiderations-producing-cannabis-for-own-medical-purposes.html.
Kanning, R. C. (2014). Banana leaves ashes as pozzolan for concrete and mortar of Portland. Construction and Building Materials, 460-465.
Khan, S. U. (2014). Effects of Different Mineral Admixtures on. Scientific World Journal, 1-12.
Married Biography. (Jul. 9, 2017). pozzolanic-reaction. Retrieved from Married Biography: https://marriedbiography.com/the-secret-behind-the-survival-of-roman-concrete-from-the-tidalbattering-for-2000-years-finally-revealed/pozzolanic-reaction/.
Metro Vancouver. (2019). Garbage and recycling tipping fees starting Jan. 2019. Retrieved from Metro Vancouver: http://www.metrovancouver.org/services/solid-waste/bylaws-regulations/tippingfee/Pages/default.aspx.
Munro, V., & Dick, K. J. (2015). The replacement of silica fume with hemp flour. Non-Conventional Materials and Technologies, (pp. 1-16). Winnipeg, Manitoba.
Pereira, C. (2013). Use of highly reactive rice husk ash in the production of cement. Industrial Crops and Products, 88-96.
Shojai, A. (n.d.). Cost Comparison of Litter. Retrieved from Pet Safe: https://www.petsafe.net/learn/costcomparison-of-litter-litterboxes.

(Continued)

*Primary Examiner* — Anthony J Green
(74) *Attorney, Agent, or Firm* — Damien G. Loveland

(57) ABSTRACT

Hemp straw is ground and burnt to result in hemp straw ash for making concrete. The hemp straw ash is mixed with water, cement, fine aggregate, coarse aggregate and superplasticizer using a two-step addition process to form a concrete mixture. The two-step addition process follows a specific order for the addition of the materials to a concrete mixer drum. Concrete made using the hemp straw ash is useful for lower-strength applications.

17 Claims, 2 Drawing Sheets

(56) References Cited

OTHER PUBLICATIONS

Vasudevan, G. (2017). Performance Using Bamboo Fiber Ash Concrete Admixture Adding Superplasticizer. IOP Conference Series: Materials Science and Engineering (pp. 1-4). Seoul, Korea : IOP Publishing.
Verseveldt, P. (2017). The most sustainable cat litter. PETS International.
Vosper, J. (n.d.). The Role of Industrial Hemp in Carbon Farming . GoodEarth Resources PTY Ltd.
Zhang, M.-H., & Malhotra, V. M. (1996). High-Performance Concrete Incorporating Rice Husk. ACI Materials Journal, 629-636.
Environmental Protection Agency. (n.d.). Compilation of Air Pollutant Emissions Factors—Fifth Edition, vol. I. Chapter 11: Mineral Products Industry, 11.6 Portland Cement Manufacturing.

* cited by examiner

HEMP STRAW ASH AS A SUPPLEMENTARY CEMENTITIOUS MATERIAL

TECHNICAL FIELD

The present invention relates to a method for making concrete with incinerated waste hemp straw. More specifically, it relates to a method for producing hemp straw ash from waste hemp straw before using the produced hemp straw ash as a supplementary cementitious material in a concrete mix.

BACKGROUND

Concrete is the most used material for building construction in the world. However, this widespread usage is responsible for at least 5% of the worldwide $CO_2$ emission annually. Concrete is prepared with a combination of several elements such as cement, sand, water, and gravel or crushed rock. Among these elements, the production of cement has the highest carbon footprint and therefore, substitution products for replacing cement have been extensively studied. For example, industrial ash by-products have been used in order to partially replace cement.

Beside industrial ash products, replacing cement by crop by-product ash such as wood ash, rice husk ash or coconut ash have been known to enhance certain physical properties of the resulting concrete. This type of cement substitution product is known as a supplementary cementitious material or SCM.

With the recent changes regarding the legal status of cannabis products in various countries, farming of the cannabis plant is expected to increase exponentially. Usually, after the cannabis plants have been harvested, only a small part of the plants is actually used for developing cannabis products. The remaining part, known as hemp straw, is usually discarded and disposed in landfills after being neutralized with cat litter and water. As a consequence, with the increase of cannabis consumption, the waste related to the production of cannabis products is expected to increase dramatically.

This background is not intended, nor should be construed, to constitute prior art against the present invention.

SUMMARY OF INVENTION

The present invention uses waste hemp straw for producing concrete. The hemp straw is first burnt in order to obtain hemp straw ash. The hemp straw ash is then used as a cement replacement in a concrete mix. The components of the mix are added and mixed in two stages. An advantage of using waste hemp straw is that it provides a method for converting the waste hemp straw that is produced by the cannabis industry every year into a useful product.

Disclosed is a process for making concrete comprising: grinding hemp straw to result in ground hemp straw; burning the ground hemp straw to result in hemp straw ash; mixing superplasticizer, fine aggregate, coarse aggregate, cement, water and the hemp straw ash to result in a concrete mixture. The concrete mixture comprises, by weight: 10-11% water; 37-41% coarse aggregate; 29-36% fine aggregate; superplasticizer up to 0.08%; hemp straw ash up to 5%; and 14 to 19% cement.

One aspect of the invention is a concrete mixture comprising, by weight: 10-11% water; 37-41% coarse aggregate; 29-36% fine aggregate; superplasticizer up to 0.08%; hemp straw ash up to 5%; and 14 to 19% cement.

Another aspect of the invention is concrete solidified from a concrete mixture, the concrete mixture comprising, by weight: 10-11% water; 37-41% coarse aggregate; 29-36% fine aggregate; superplasticizer up to 0.08%; hemp straw ash up to 5%; and 14 to 19% cement.

BRIEF DESCRIPTION OF DRAWINGS

The following drawings illustrate embodiments of the invention, which should not be construed as restricting the scope of the invention in any way.

DESCRIPTION

A. Glossary

Coarse aggregate is made up of inert, inorganic particles, such as gravel, with a size of greater than 4.75 mm.

Concrete refers to a composite material usually composed of water, cement, fine aggregate, coarse aggregate, and optionally plasticizer or superplasticizer.

Fine aggregate is made up of inert, inorganic particles that have a size of 4.75 mm or less.

Hemp refers to a strain of *Cannabis sativa*, however in the present disclosure it refers to any cannabis plant without the flower buds.

Hemp straw, or hemp straw waste, refers to the part of any cannabis plant that is not used for extracting cannabis. In some cases this is the cannabis plant without the buds, or in other cases the cannabis plant without the buds and the leaves.

SCM or Supplementary Cementitious Material refers to a material that is used to supplement cement and give additional properties to the concrete mix such as workability and durability.

B. Exemplary Process

Figure 1:
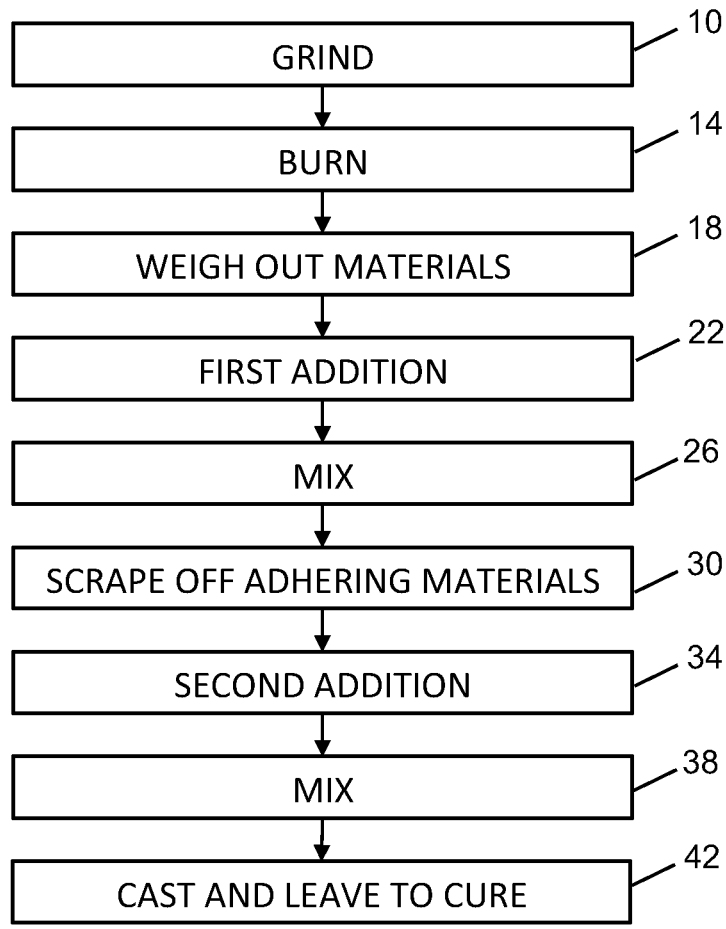
FIG. 1 is a detailed flowchart describing the process for making concrete with hemp straw ash according to an embodiment of the present invention.

Referring to FIG. 1, there is shown a flowchart of the process for making concrete with hemp straw ash. In step 10, the hemp straw is ground. Depending on the scale of the operation, different types of grinder are used. For example, on a lab scale, the hemp straw is ground using an agate mortar or vibrating ball mill. For larger quantities of hemp straw, a knife-type grinder is used. In some embodiments, the grinding step 10 is carried out for a duration of a few hours to several days.

After that, the ground hemp straw is burnt in step 14. In a first stage, the ground hemp straw is placed in an open container burner in order to be charred. In a second stage, the resulting charred material, still containing organic material, is then placed into an oven set at a temperature of 121° C. (250° F.) for 90 minutes. Then the hemp straw ash is removed from the oven and deposited on a tray to smolder and cool off. This two-stage burning process results in a mass reduction of 10:1 from the initial hemp straw to a fine grey/white powder ash. In some embodiments, a muffle furnace is used for the burning step 14.

In other embodiments, the hemp straw waste is incinerated in a single step in a furnace set to a temperature of between 500-900° C., over a duration of between 1-24 hours.

In step 18, hemp straw ash, water, superplasticizer, coarse aggregate, cement and fine aggregate are either weighed out or necessary amounts of each of these components are otherwise determined.

Before the components are mixed, in step 22, the walls of a concrete mixer drum are dampened using water. In some embodiments, the concrete mixer drum is a Bolton mixer drum such as a Bolton Pro™ 3.5 CuFt cement mixer. Next, a first portion of the necessary components is prepared in order to be added to the concrete mixer drum in the first addition step 22. After addition to the drum, the components are mixed for 3 minutes in step 26, resulting in an intermediate mixture.

After the mixing step 26, the concrete mixer drum is turned off and the materials adhering to the inner walls of the concrete mixer drum, if any, are scraped off, in step 30. Some components of the interim mixture adhere to the walls during the mixing, therefore it is important to scrape off these components from the walls to preserve an accurate and homogenous mixing ratio.

In step 34, a second addition to the mix is made by adding water, coarse aggregate, cement and fine aggregate to the concrete mixer drum. The components of this second addition are the components that remain after the first addition step 22. Then, in step 38, the components in their entirety are mixed in the concrete mixer drum for 4 minutes to result in the final concrete mixture.

The concrete mixture is then cast and left to cure in step 42. Cement and water in the concrete mix form a glue or binder that fills the spaces between the coarse and fine aggregates while the concrete cures. In some embodiments, the concrete mix is left in a controlled curing environment where the temperature and the relative humidity are set by an operator. For example, the temperature in the curing environment may be set at 23±2° C. and the relative humidity at 95%-rh. The interaction between cement and water is known as hydration. The process of hydration sees dicalcium silicate and tricalcium silicate in the cement react with water to produce calcium silicate hydrate (CSH). CSH can be described as a gel that fills the spaces within the aggregate and hardens to give the concrete strength and durability.

Figure 2:
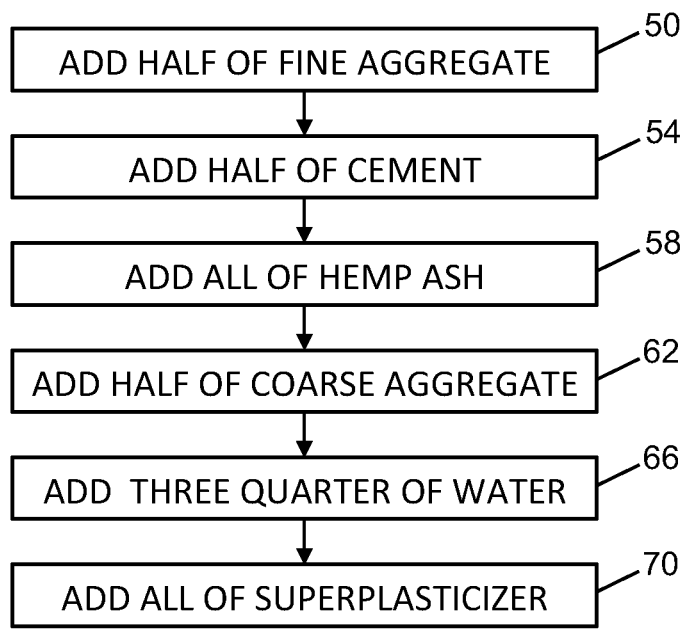
FIG. 2 is a flowchart describing the process for the first concrete mixing step according to an embodiment of the present invention.

Referring to FIG. 2, the amounts of the components needed for the first addition of material to the concrete mixer drum include half of the determined amount of fine aggregate, half of the determined amount of cement (or general use Portland cement), all of the hemp straw ash, half of the determined amount of coarse aggregate (i.e. aggregate with a particle size of 4.75 mm or more), three quarters of the overall determined amount of water, and all of the superplasticizer.

In step 50, half of the total amount of the fine aggregate is added to the concrete mixer drum. The fine aggregate is sand, or river sand, for example. In some embodiments, the fine aggregate is smaller grade crushed stone.

In step 54, half of the total amount of cement is placed in the concrete mixer drum. The cement is made of kiln-fired limestone and clay that are ground with gypsum. The average particle size of the cement varies between 5 μm and 45 μm.

In step 58, the total amount of hemp straw ash is added to the concrete mixer drum.

In step 62, half of the total amount of the coarse aggregate is added to the concrete mixer drum. The coarse aggregate is gravel, for example. In some embodiments, the coarse aggregate is coarsely crushed stone, and/or recycled aggregate.

In step 66, three quarters of the total required amount of water is added to the concrete mixer drum. Tap water is used for the mix.

In step 70, all of the superplasticizer is added to the concrete mixer drum. In some embodiments, the superplasticizer is Viscocrete® plasticizer. In some embodiments, superplasticizer other than Viscocrete® is used. In some embodiments, a plasticizer is used instead of a superplasticizer. In some embodiments, step 66 and step 70 are performed together as the superplasticizer is pre-mixed with the water.

When all of the components have been added to the concrete mixer drum, the resulting intermediate mixture is mixed for 4 minutes. In other embodiments this mixing time is anywhere from 3-5 minutes, although increased mixing times may lead to segregation.

Figure 3:
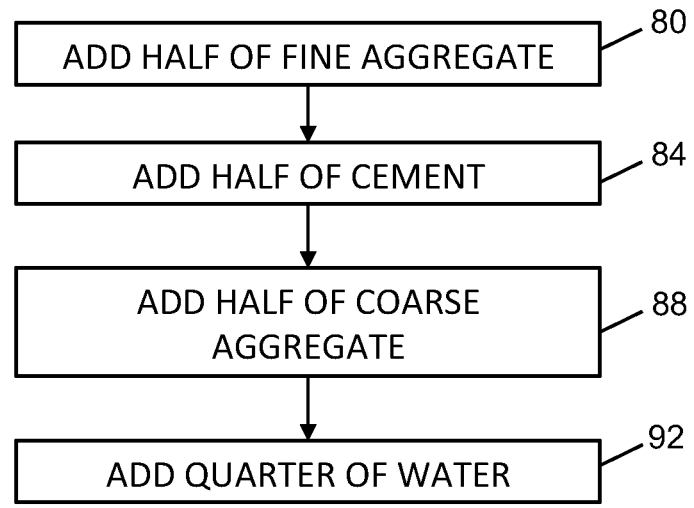
FIG. 3 is a flowchart describing the process for the second concrete mixing step according to an embodiment of the present invention.

Referring to FIG. 3, the material for the second addition includes the remaining quantities of the components, which are half of the total determined amount of fine aggregate, half of the total amount of cement, half of the total determined amount of coarse aggregate, and a quarter of the total determined amount of water. These remaining components are added to the concrete mixer drum in the same sequence as the previous additions in steps 50, 54, 62 and 66 in FIG. 2.

The remaining half of the determined amount of fine aggregate is added to the concrete mixer drum in step 80. The remaining half of the determined amount of cement is then added to the concrete mixer drum in step 84. Then, in step 88, the remaining half of the determined amount of coarse aggregate is added to the concrete mixer drum. In step 92, the remaining quarter of the determined amount of water is added to the concrete mixer drum.

When all of the remaining components have been added to the concrete mixer drum, the concrete mixture is mixed for a further 3 minutes. In other embodiments this mixing time may be different, bearing in mind that increased mixing times may lead to segregation.

The overall composition of the mixture of concrete is 10% water, 29-30% fine aggregate, 41% coarse aggregate, up to 0.05% superplasticizer, up to 5% hemp straw ash and 15 to 19% cement, with a water to binder ratio (w/b) equal to 0.50 by weight. Percentage contents are given by weight here, and throughout this disclosure. The binder is the combination of the cement and the hemp straw ash.

In some embodiments, the water to binder ratio (w/b) of the concrete is different, e.g. 0.55. The overall composition of the mixture of concrete is 10-11% water, 30-36% fine aggregate, 37-41% coarse aggregate, up to 0.08% superplasticizer, up to 5% hemp straw ash and 14-17% cement, with a water to binder ratio (w/b) equal to 0.55, by weight.

The above set of composition ratios is derived from the raw data in TABLE 1, in which the various components of the concrete mixture are given as a weight per unit volume. The hemp straw ash is expressed as both a weight per unit volume and a percentage of the binder.

The overall composition that covers both the above ranges is 10-11% water, 30-36% fine aggregate, 37-41% coarse aggregate, up to 0.08% superplasticizer, up to 5% hemp straw ash and 14-19% cement, with a water to binder ratio (w/b) between 0.50-0.55, by weight. The fine aggregate and coarse aggregate when combined make up 70-73% of the mixture.

TABLE 1

| Material (kg/m³) | w/b = 0.50 Hemp Ash Percentage | | | | w/b = 0.55 Hemp Ash Percentage | | | |
|---|---|---|---|---|---|---|---|---|
| | 0 | 5 | 15 | 25 | 0 | 5 | 15 | 25 |
| Portland Cement | 430 | 408.5 | 365.5 | 322.5 | 420 | 399 | 357 | 315 |
| Hemp Ash | — | 21.5 | 64.5 | 107.5 | — | 21 | 63 | 105 |
| Coarse Aggregate | 920 | 915 | 910 | 910 | 900 | 900 | 890 | 880 |
| Fine Aggregate | 665 | 665 | 660 | 650 | 855 | 855 | 650 | 650 |
| Water Reducing Admixture | 215 | 215 | 215 | 215 | 231 | 231 | 231 | 231 |
| Superplasticizer | — | 0.25 | 0.3 | 1 | — | 0.25 | 0.5 | 1.75 |

The cured concrete mixes for a hemp ash percentage of 5-25% of the binder exhibit, after 28 days, a strength of between 22 MPa to 34 MPa for a 0.50 water to binder ratio, by weight. The cured concrete mixes for a hemp ash percentage of 5-25% of the binder exhibit, after 28 days, a strength of between 22 MPa to 29 MPa for a 0.55 water to binder ratio, by weight. This shows that adding hemp straw ash to the concrete mix reduces the strength of the concrete, compared to what its strength would be without the hemp straw ash. However, the resulting strength of the concrete is still sufficient for various concrete applications such as blinding concrete, masonry backfill, footing or floor slabs. The strength of the concrete diminishes as the percentage of hemp straw ash increases, and so the percentage content of hemp straw ash should be selected according to the particular application of the concrete.

In some embodiments, the concrete is tested for slump properties, air content, density and temperature. Precise measurements and testing are carried out in order to characterize the workability, density, freeze thaw resistance and the calorimetry properties of the fresh concrete.

Optionally, after the second mixing step 38, fresh concrete testing procedures are carried out. For example, TABLE 2 shows data obtained after running a series of fresh concrete tests. In TABLE 2, the binder is the combination of the cement and the ash, if present.

TABLE 2

| Water/binder ratio | Ash content in binder (%) | Slump (mm) | Temperature (degree C.) | Density (kg/m³) | Air (%) |
|---|---|---|---|---|---|
| 0.50 | 0 | 210 | 16 | 2347 | 4.0% |
| 0.50 | 5 | 85 | 16 | 2369 | 2.6% |
| 0.50 | 15 | 0 | 19 | 2351 | 1.7% |
| 0.50 | 25 | 0 | 17 | 2356 | 2.0% |
| 0.55 | 0 | 250 | 6 | 2401 | 1.4% |
| 0.55 | 5 | 220 | 7 | 2352 | 2.2% |
| 0.55 | 15 | 190 | 9.5 | 2327 | 2.3% |
| 0.55 | 25 | 35 | 15 | 2321 | 2.2% |

In some of the embodiments, a larger content of superplasticizer is added to the fresh concrete to retain its workability. In particular, when the hemp straw ash is over 15% of the binder, as shown in TABLE 1, considerably more superplasticizer is required to place the concrete.

For concrete mixtures with a good workability, in which a reasonably low amount of superplasticizer is required, the hemp straw ash content should be limited to 15% of the binder, by weight. In this case, the overall composition of the mixture of concrete is 10% water, 30% fine aggregate, 41% coarse aggregate, up to 0.014% superplasticizer, up to 3% hemp straw ash and 14 to 19% cement, with a water to binder ratio (w/b) equal to 0.50 by weight. The overall composition of the mixture of concrete is 10-11% water, 30-36% fine aggregate, 37-41% coarse aggregate, up to 0.03% superplasticizer, up to 3% hemp straw ash and 16-17% cement, with a water to binder ratio (w/b) equal to 0.55 by weight.

The overall composition that covers both the above ranges of composition, for hemp limited to 15% of the binder, is 10-11% water, 30-36% fine aggregate, 37-41% coarse aggregate, up to 0.03% superplasticizer, up to 3% hemp straw ash and 16-19% cement, with a water to binder ratio (w/b) between 0.50-0.55.

Furthermore, it is possible to obtain additional information about the mechanical properties of the concrete by running, for example, a compressive strength test and a micro-hardness test at different ages. In addition, the durability properties of the concrete may be studied by measuring its water absorption, drying shrinkage, plastic shrinkage permeability (water or air) and chloride-ion diffusion. For example, the air content in the concrete was approximately 2% for all values of hemp straw ash content.

Microstructural analysis of the concrete may be also carried out using characterization techniques such as scanning electron microscopy (SEM), energy dispersive spectroscopy (EDS) and/or X-ray diffraction (XRD).

While other water to binder ratios are possible, is has been found that if a ratio of 0.45 by weight of water to binder is used, the workability of the concrete is poor. It is therefore to be expected that the lower limit of the ratio should be above 0.45 and below 0.50.

C. Variations

Figure 4:
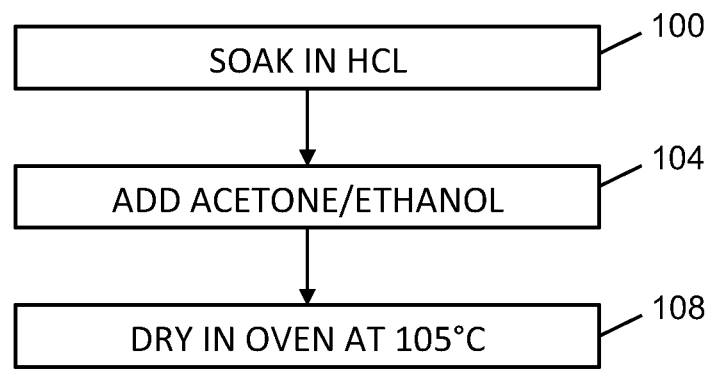
FIG. 4 is a flowchart describing a process for preparing the hemp straw ash according to an embodiment of the present invention.

Referring to FIG. 4, there is shown a different embodiment for the preparation of the hemp straw ash, prior to its being burnt. After being ground, the ground hemp straw is treated with diluted hydrochloric acid (HCl) in order to remove metallic impurities by acid leaching, in step 100. This step reduces energy consumption during the subsequent burning or incineration step. The ground hemp straw is soaked at room temperature in a solution of HCl 6 M for 5 hours, in step 100. Other concentrations and times may be possible in other embodiments. After this, it is washed at room temperature in ethanol/acetone to remove chlorides, using a solvent exchange method in step 104. Then, in step 108, the ground hemp straw is placed directly in an oven set at a temperature of 105° C. Other temperatures are clearly possible in other embodiments. The solvent exchange method is used to increase the speed of the drying process in the oven.

In some embodiments, other materials are added to the mix in order to supplement the cement binder. For example, pozzolans or pozzolanic ashes are added to the mix in order to trigger a pozzolanic reaction. During this process, the pozzolans react with calcium hydroxide, which is a by-product of cement hydration. This results in concrete with higher strength and/or hardness compared to a mix with only the conventional Portland cement binder.

In some embodiments, the hemp straw waste is used as hemp fiber composite for replacing the synthetic/conventional glass fiber composites in the concrete. Hemp fiber composites exhibit low thermal conductivity, low density, good specific tensile properties and lower cost. It is also a material that is easy to produce and is derived from a renewable resource.

Temperatures that have been given to the nearest degree include all temperatures within a range of ±0.5° C. of the given value. Numerical values, such as percentages, are to be taken to be accurate to the least significant digit. For example, 10% covers all values from 9.5% to 10.5%. A range of 30-36% covers all values from 29.5% to 36.5%. Values given as fractions are to be interpreted as covering all values within ±20% of the fraction.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification is to be regarded in an illustrative, rather than a restrictive, sense.

It will be clear to one having skill in the art that further variations to the specific details disclosed herein can be made, resulting in other embodiments that are within the scope of the invention disclosed. Particular parameters and materials described herein are examples only and may be changed depending on the specific embodiment. Accordingly, the scope of the invention is to be construed in accordance with the substance defined by the following claims.

The invention claimed is:

1. A process for making concrete comprising:
grinding hemp straw to result in ground hemp straw;
burning the ground hemp straw to result in hemp straw ash;
mixing superplasticizer, fine aggregate, coarse aggregate, cement, water and the hemp straw ash to result in a concrete mixture, wherein the concrete mixture comprises, by weight:
10-11% water;
37-41% coarse aggregate;
29-36% fine aggregate;
superplasticizer up to 0.08%;
hemp straw ash up to 5%; and
14 to 19% cement.

2. The process of claim 1, wherein the fine aggregate and coarse aggregate combined form 70-73% of the concrete mixture.

3. The process of claim 1, wherein the cement and hemp straw ash are a binder, and the concrete mixture has a water to binder ratio, by weight, of between 0.50 and 0.55.

4. The process of claim 1, wherein the concrete mixture comprises, by weight:
10-11% water;
37-41% of coarse aggregate;
30-36% of fine aggregate;
superplasticizer up to 0.03%;
hemp straw ash up to 3%; and
16 to 19% cement.

5. The process of claim 1, wherein the mixing step is split into two stages and a first stage of the mixing step comprises, in order:

placing half of the fine aggregate in a concrete mixer drum;
adding half of the cement to the concrete mixer drum
adding all of the hemp straw to the concrete mixer drum;
adding half of the coarse aggregate to the concrete mixer drum; and
adding three quarters of the water and all of the superplasticizer to the concrete mixer drum;
thereby resulting in an intermediate mixture.

6. The process of claim 5, wherein a second stage of the mixing step comprises, in order:
adding the other half of the fine aggregate to the concrete mixer drum;
adding the other half of the cement to the concrete mixer drum;
adding the other half of the coarse aggregate to the concrete mixer drum; and
adding the remaining quarter of the water to the concrete mixer drum;
thereby resulting in the concrete mixture.

7. The process of claim 6, comprising:
mixing the intermediate mixture for 4 minutes; and
mixing the concrete mixture for 3 minutes.

8. The process of claim 1, wherein burning the ground hemp straw occurs in an incinerator set at a temperature of 500-900° C., for a duration of 1-24 hrs.

9. The process of claim 1, comprising soaking the ground hemp straw in a solution of HCl 6 M for 5 hours.

10. The process of claim 9, comprising treating the ground hemp straw in ethanol and/or acetone using a solvent exchange method after soaking the ground hemp straw in the HCl 6 M solution.

11. The process of claim 10, comprising heating the ground hemp straw at a temperature of 105° C. in an oven after treating the ground hemp straw in ethanol and/or acetone.

12. A concrete mixture comprising, by weight:
10-11% water;
37-41% coarse aggregate;
29-36% fine aggregate;
superplasticizer up to 0.08%;
hemp straw ash up to 5%; and
14 to 19% cement.

13. The concrete mixture of claim 12, wherein:
the fine aggregate is sand;
the cement has a particle size of 5 μm to 45 μm; and
the coarse aggregate is gravel with a particle size of 12 mm or more.

14. The concrete mixture of claim 12, comprising a supplementary cementitious material that induces a pozzolanic reaction in the mixture.

15. The concrete mixture of claim 12, wherein the cement and hemp straw ash are a binder, and the mixture has a water to binder ratio, by weight, of between 0.50 and 0.55.

16. The concrete mixture of claim 12, comprising, by weight:
10-11% water;
37-41% coarse aggregate;
30-36% fine aggregate;
superplasticizer up to 0.03%;
hemp straw ash up to 3%; and
16 to 19% cement.

17. Concrete solidified from a concrete mixture, the concrete mixture comprising, by weight:
10-11% water;
37-41% coarse aggregate;
29-36% fine aggregate;

superplasticizer up to 0.08%;
hemp straw ash up to 5%; and
14 to 19% cement.

* * * * *